US012116220B2

(12) United States Patent
Müller et al.

(10) Patent No.: US 12,116,220 B2
(45) Date of Patent: Oct. 15, 2024

(54) INCLINATION COMPENSATING DEVICE FOR A CARRIAGE OF A CONVEYING DEVICE

(71) Applicant: BEUMER GROUP GMBH & CO. KG, Beckum (DE)

(72) Inventors: Christian Müller, Wetter (DE); Markus Dirkmann, Delde (DE)

(73) Assignee: BEUMER GROUP GMBH & CO. KG, Beckum (DE)

( * ) Notice: Subject to any disclaimer, the term of this patent is extended or adjusted under 35 U.S.C. 154(b) by 76 days.

(21) Appl. No.: 17/919,925

(22) PCT Filed: Apr. 15, 2021

(86) PCT No.: PCT/EP2021/059773
§ 371 (c)(1),
(2) Date: Oct. 19, 2022

(87) PCT Pub. No.: WO2021/213885
PCT Pub. Date: Oct. 28, 2021

(65) Prior Publication Data
US 2023/0159283 A1    May 25, 2023

(30) Foreign Application Priority Data

Apr. 22, 2020   (EP) ..................................... 20170939

(51) Int. Cl.
*B65G 47/96*        (2006.01)
*B65G 17/18*        (2006.01)
(52) U.S. Cl.
CPC ........... *B65G 47/962* (2013.01); *B65G 17/18* (2013.01); *B65G 2201/02* (2013.01)

(58) Field of Classification Search
None
See application file for complete search history.

(56) References Cited

U.S. PATENT DOCUMENTS

| 9,422,119 B1 * | 8/2016 | Fortenbery | ............ B65G 47/38 |
| 10,562,716 B2 * | 2/2020 | Fujio | .................... B65G 47/962 |

(Continued)

FOREIGN PATENT DOCUMENTS

| GB | 133126 A | 9/1919 |
| GB | 2153772 A | 8/1985 |

(Continued)

OTHER PUBLICATIONS

International Search Report (English and German) and Written Opinion of the International Searching Authority (German) issued in PCT/EP2021/059773, mailed Jul. 19, 2021; ISA/EP.

*Primary Examiner* — Kavel Singh
(74) *Attorney, Agent, or Firm* — Harness, Dickey & Pierce, P.L.C.

(57) ABSTRACT

An inclination compensating device for a carriage of a conveyor device for the horizontal transport of conveyed material, wherein a drive element is driven via the pivot drive, which drive element is fastened to an end of a pivot lever extending away from the inclination compensating element, which end is opposite the inclination compensating element, and which drive element has a drive axis arranged parallel or perpendicular to the pivot axis, wherein the drive element rolls on at least one guide, in particular extending equidistantly to the pivot axis, in particular in a force-locking or form-locking manner, which guide is mounted or formed on the holding frame.

16 Claims, 4 Drawing Sheets

(56) References Cited

Figure 1:
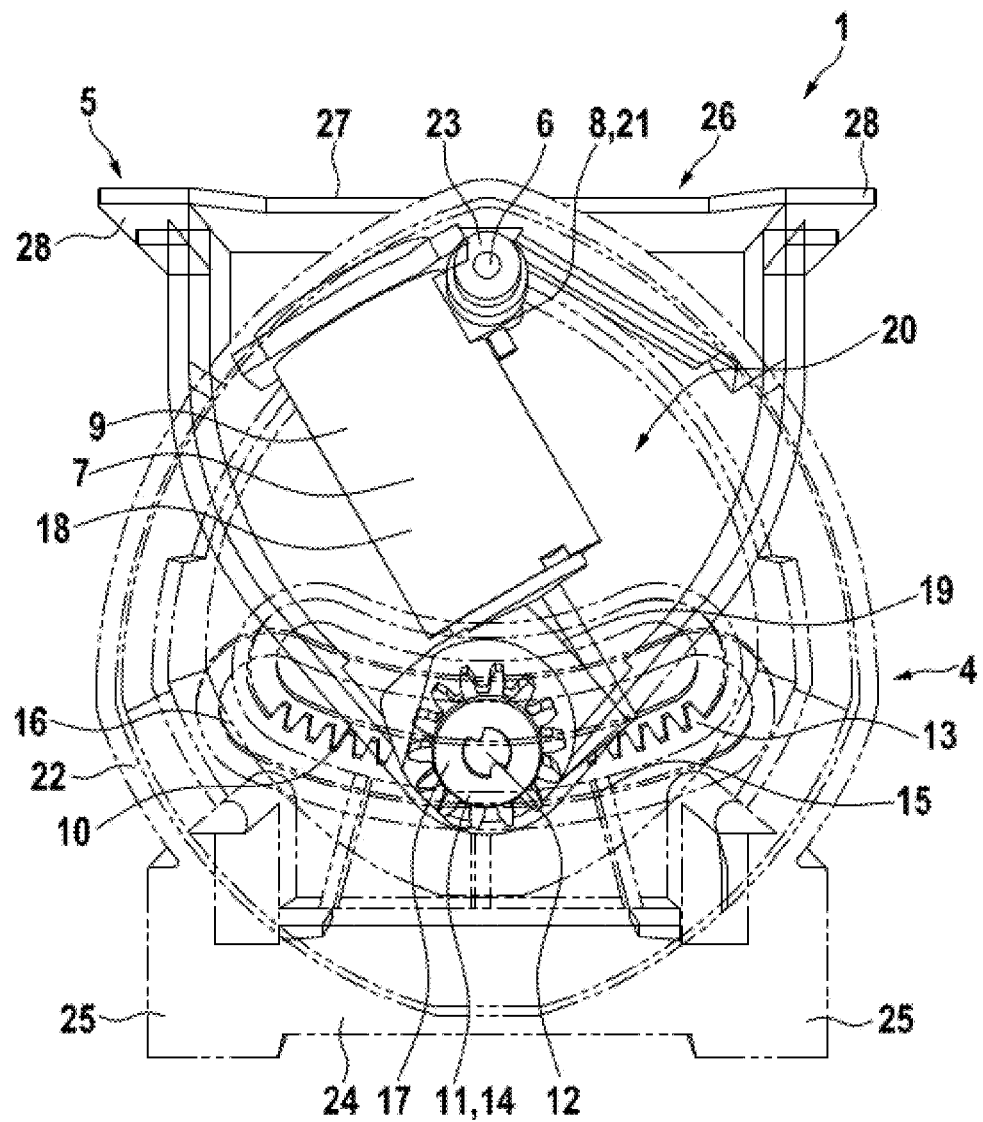

U.S. PATENT DOCUMENTS 10,668,506 B2 * 6/2020 Erden .................... B65G 47/96
2006/0260908 A1 11/2006 Affaticati

FOREIGN PATENT DOCUMENTS

| JP | H09156746 A | 6/1997 |
| KR | 101100854 B1 | 1/2012 |
| WO | WO-2004078624 A1 | 9/2004 |
| WO | WO-2016206967 A1 | 12/2016 |

* cited by examiner

INCLINATION COMPENSATING DEVICE FOR A CARRIAGE OF A CONVEYING DEVICE

CROSS-REFERENCE TO RELATED APPLICATIONS

This application is a U.S. National Phase Application under 35 U.S.C. 371 of International Application No. PCT/EP2021/059773, filed on Apr. 15, 2021, which claims the benefit of European Patent Application No. 20170939.1, filed on Apr. 22, 2020. The entire disclosures of the above applications are incorporated herein by reference.

BACKGROUND

This section provides background information related to the present disclosure which is not necessarily prior art.

TECHNICAL FIELD

The invention relates to an inclination compensating device for a carriage of a conveyor device for the horizontal transport of conveyed material, having a holding frame and an inclination compensating element held therein via a pivot axis arranged perpendicular to the direction of travel, further having a pivot drive for pivoting the inclination compensating element relative to the holding frame about the pivot axis, further comprising a pivot drive controller receiving inclination change notifications relating to the inclination compensating device, wherein the pivot drive is controlled upon receipt of an inclination change command corresponding to an inclination change notification on the part of the pivot drive controller, that the inclination compensating element is continuously held in the horizontal, wherein a drive element attached to an end of a pivot lever extending away from the inclination compensating element opposite the inclination compensating element is driven via the pivot drive, which drive element has a drive axis arranged parallel or perpendicular to the pivot axis, wherein the drive element rolls on at least one guide, in particular running equidistantly to the pivot axis, in particular in a force-locking or form-locking manner, which guide is mounted or formed on the holding frame.

DISCUSSION

WO 2016/206967 A1 describes a conveying device for generating a slope compensation, which for generating a level compensation has an additional level compensation rail next to the conveying path and independent of the conveyor carriage, the distance of which to the conveying path is varied for a respective slope-dependent level compensation.

The inclination compensation device known from the prior art has the disadvantage that the provision of a level compensation rail requires a complex construction and thus on the one hand complicates the handling of the transported material and on the other hand takes up a lot of space.

SUMMARY

This section provides a general summary of the disclosure, and is not a comprehensive disclosure of its full scope or all of its features.

It is therefore one aspect of the invention to further develop an inclination compensation device for a conveyor carriage in such a way that it requires less design effort and is compatible with a wide range of conveyor sections.

Accordingly, an inclination compensating device is provided for a carriage of a conveying device for the horizontal transport of conveyed material, with a holding frame and an inclination compensating element held therein via a pivot axis arranged perpendicular to the direction of travel.

The claimed compensation element makes it possible, for example, for a sorter to travel both uphill and downhill when transporting products, while keeping the product to be transported horizontal. By mounting the inclination compensating element in the holding frame in a common pivot point, rotation of the inclination compensating element relative to the holding frame is made possible. Since the holding frame is rigidly connected to a conveyor carriage, the holding frame undergoes corresponding inclination movements when the conveyor line is inclined or declined. The inclination compensation element, which can be rotated in contrast, can thus compensate for the inclination by correspondingly counteracting the pivot drive. It is conceivable that the inclination of the inclination compensation element adjusts accordingly depending on the incline or decline, whereby it may be provided that the inclination compensation element can be stopped in any possible intermediate position. It may further be provided that the speed at which the inclination compensating device performs inclination compensation is adjustable. The pivot point or the pivot axis of the inclination compensating element can be arranged centrally, but it is alternatively possible that this can also be arranged off-center.

The inclination compensating element may have a surface located above the pivot axis. Furthermore, the inclination compensating element can extend at least from the pivot axis to the drive axis. The pivot lever thus corresponds in particular to the section of the inclination compensating element that corresponds to the distance between the pivot axis and the drive axis.

In particular, the holding frame can have two holding arms between which the inclination compensating element is held, wherein the pivot lever can be arranged between the holding arms and the guide can be mounted or formed on at least one of the holding arms. In particular, the pivot lever can be arranged centrally between the holding arms.

For example, two, in particular opposing, drive elements driven by the drive axis can be provided, which roll in a force-fitting or form-fitting manner on two opposing guides, in particular each running equidistantly to the pivot axis, which can be mounted or formed on the two opposing retaining arms. The guides can be designed as a rolling track and/or as a drive track.

In this case, the drive element can be a toothed pinion mounted on the drive axle and the guide can have a curved toothed rack running equidistantly to the pivot axis, in which the toothed pinion engages. In the sense of a kinematic reversal, a toothed rack can likewise be arranged on the inclination compensating element, which can be driven by a drive means, in particular a toothed wheel/pinion, attached to the holding frame. Alternatively, it can be provided that the pivot drive is operated pneumatically. Further alternatively, it can be provided that the pivot drive has a linear drive or a spindle drive.

Furthermore, the guide can have a guide groove adjacent to the rack, in which a smooth shaft section adjacent to the teeth of the pinion is guided. The guide groove serves in particular to prevent the pinion from jumping out of the rack, which could occur in dynamic driving situations caused by load changes in curves or uphill or downhill sections and by the transport of large loads. The guide groove also limits the travel path of the pinion in the lateral direction so that overrunning of the rack is also prevented, whereas without such a limitation the pinion could no longer engage with the rack if necessary.

The pivot drive can in particular have an electric motor and a gearbox, which are attached to the inclination compensating element and via which the drive axle is driven. The gearbox can in particular be self-locking. Furthermore, the gearbox can be a worm gear, in particular a self-locking worm gear. As a result, the motor and the gearbox can be used to drive the drive means or means, in particular the toothed pinion or pinions, which run on the corresponding guide or guides, in particular on the toothed rack, and thus enable the inclination compensating element to be pivoted.

The rotary drive can be mounted on or in the inclination compensating element. In particular, the electric motor and the gearbox can be arranged inside the inclination compensating element. In particular, the inclination detection unit can be mounted directly next to the pivot axis on the inclination compensating element. Particularly preferably, the inclination detection unit is arranged directly below the pivot axis.

It may be provided that the slew drive controller receives the inclination change notifications from an inclination change notification unit. The notification may be stored in the slew drive controller or received from the central controller of the conveyor. For example, it may be provided that the current inclination is transmitted based on a position model. In the position model, all inclines and declines from every possible position of the conveyor may be known. The position model may be stored in the central controller or the swing drive controller. Alternatively, it is conceivable that the inclination compensation device receives the inclination change notifications when passing through light barriers, so that a corresponding inclination compensation is triggered thereby. It is further conceivable that the inclination compensating device receives the inclination change notifications through infrared sensors or through defined perforated grids in the frame.

It may be provided that the inclination change notification unit is an inclination sensor attached to the inclination compensating device or to a conveyor carriage comprising the inclination compensating device. Alternatively, the swing drive control unit may include a memory unit in which specific inclination change information relating to the conveyor section is stored. Further alternatively, the swing drive controller may be subordinate to a control unit of the conveyor device, from which the swing drive controller continuously receives inclination change notifications.

Furthermore, it can be provided that the inclination change notification unit is designed as a light barrier, through which an inclination change command is triggered when it passes. The conveyor device can have a conveyor section and at least one conveyor carriage with an inclination compensation device, whereby in each case at least one light barrier can be arranged in the conveying direction upstream of a section with a changed inclination.

The slew drive controller, upon receipt of inclination change information by the inclination detection unit, can output a corresponding opposite inclination change command to the slew drive, by which the at least one drive element is moved on the at least one guide by a distance corresponding to the inclination change information. If the inclination change information includes an indication that the carriage has traveled up an incline and the holding frame thereby rotates counterclockwise with respect to the horizontal, the inclination change command causes the swing drive to move such that the inclination compensating element rotates through the same but opposite angle, i.e., clockwise, so that the inclination compensating element always remains in a horizontal position.

Furthermore, the retaining arms can have two aligned bushings in which the pivot axis arranged on the inclination compensating element is rotatably mounted. The bushings can, for example, accommodate plain bearings. The inclination compensating element can have two axle journals for realizing the pivot axis, which can engage in the plain bearings accommodated in the bushings. Alternatively, the bearing arrangement can be reversed so that the inclination compensating element has bushings and the retaining arms have corresponding axle journals.

The retaining arms can be coupled to each other via connecting sections in such a way that the inclination compensating element can be freely pivoted between the retaining arms. The connecting sections can be integrally formed with the retaining arms. In particular, the connecting sections can connect the two opposing retaining arms to one another in a foot area of the retaining frame. In this case, the retaining arms together with the position for the pivot axis arranged in the retaining arms can project beyond the connecting section or sections in such a way that the inclination compensating element can be pivoted freely without coming into engagement with the retaining frame, in particular the connecting sections. In particular, the retaining arms can each be formed as castings, to each of which a partial connecting section is molded. The connecting sections can then be welded together to connect the opposing frame halves.

The holding frame can have a plurality of feet by means of which the inclination compensating device can be mounted on a trolley. Preferably, two feet are arranged below each support arm. The feet may be integral with the respective support arm. The feet can also be integral with the connecting section associated with the respective support arm.

The inclination compensation element may have a flat surface on its upper side, at least in sections. During normal travel operation of the conveyor, this surface can be aligned horizontally.

In addition, the inclination compensating element can have projections on its upper side for attaching connecting elements. In particular, two projections can be provided, one facing forward in the direction of travel and the other facing rearward. The projections can each be arranged on the upper edge of the inclination compensating element and be part of the at least partially flat surface.

In particular, the pivot lever can be integral with the inclination compensating element. The inclination compensating element, which forms the flat platform in the upper area, can taper towards the bottom. In the interior of the inclination compensating element, the electric motor and the gearbox can be accommodated and connected to one another as elements of the slewing drive. In particular, the pivot drive can be attached at least to the pivot axis and fastened to the drive axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
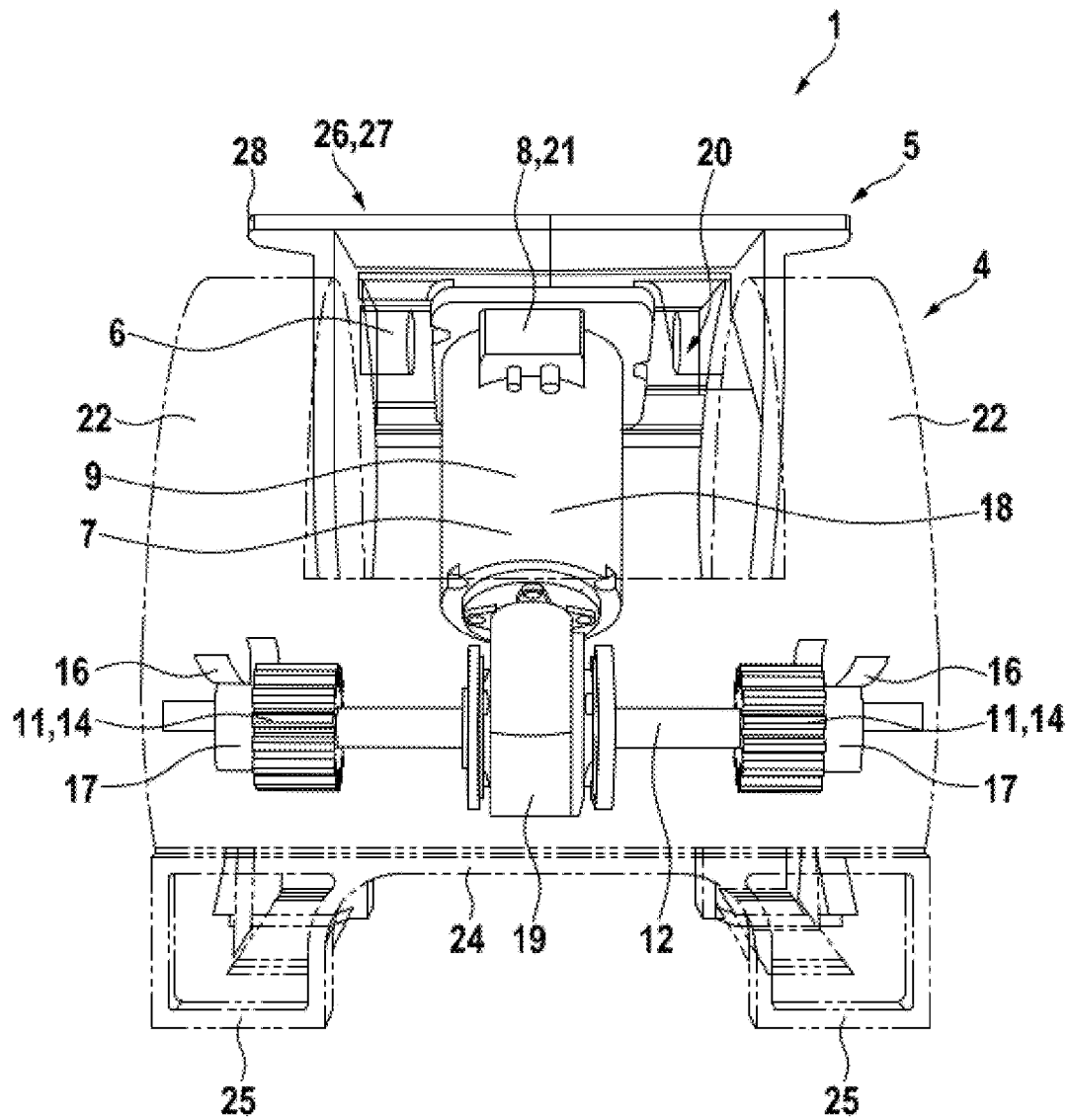
Figure 3:
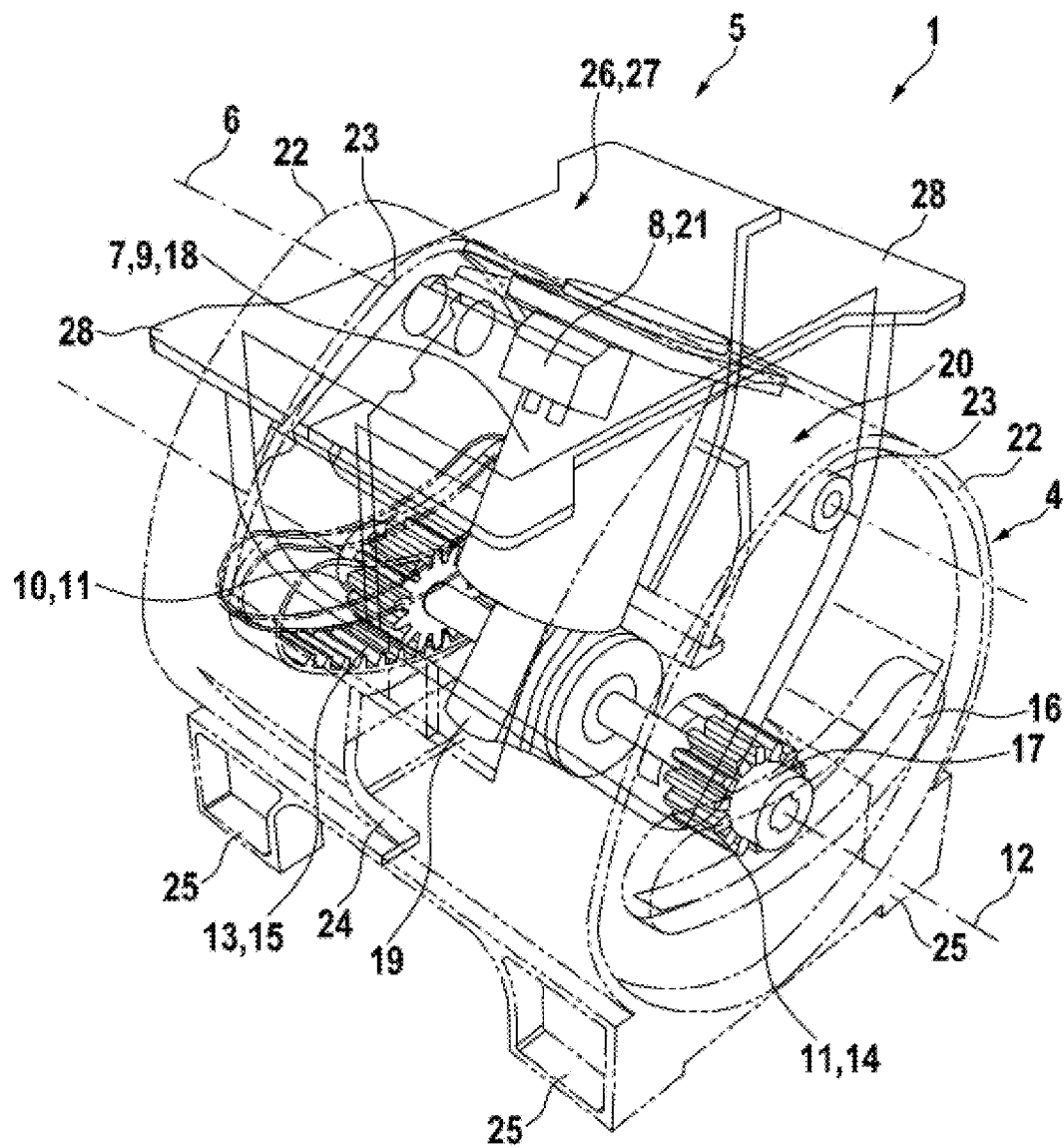
Figure 4:
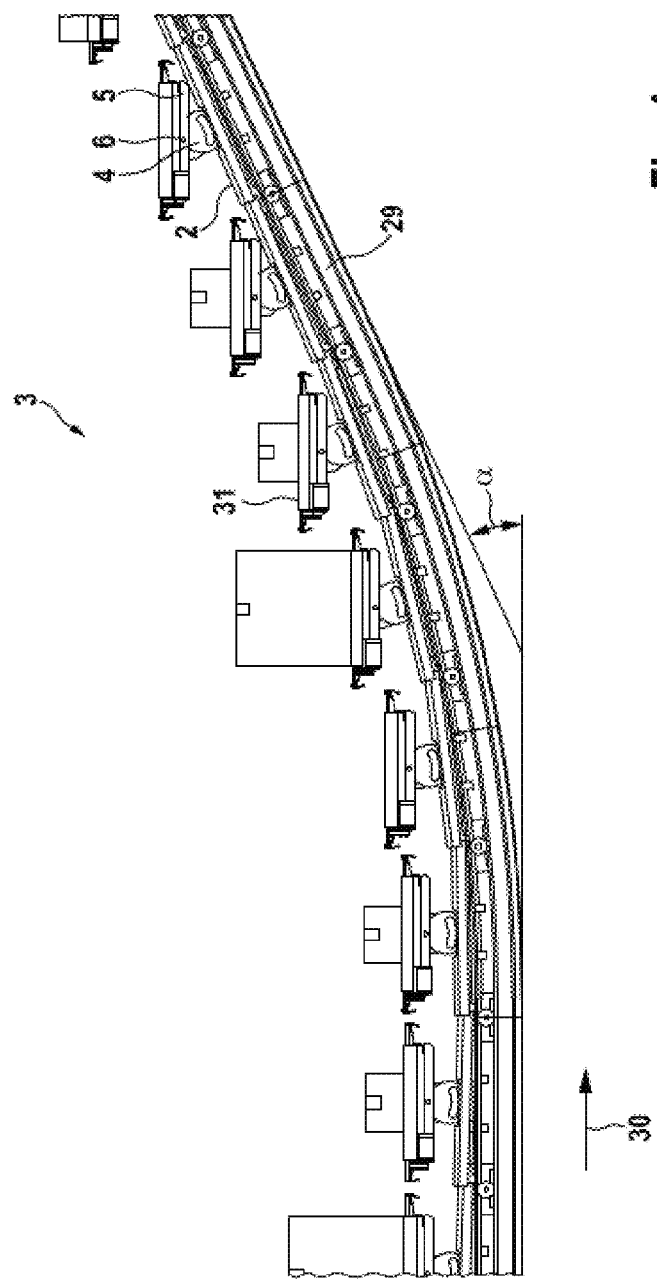

Exemplary embodiments of the invention are explained with reference to the following figures. Thereby shows:

FIG. 1 side view of an embodiment of the inclination compensating device;

FIG. 2 frontal view of the embodiment of the inclination compensating device according to FIG. 1;

FIG. 3 perspective view of the embodiment of the inclination compensating device according to FIG. 1; and FIG. 4 side view of a conveyor device comprising the inclination compensation device according to the invention.

DETAILED DESCRIPTION

Example embodiments will now be described more fully with reference to the accompanying drawings.

The inclination compensating device 1 shown in FIG. 1 has a holding frame 4 and an inclination compensating element 5, which is pivotably mounted and held in the holding frame 4 via a pivot axis 6. For this purpose, the inclination compensating element 5 has axle journals which engage in corresponding bushings 23 formed in the holding frame 4, in which bushings, for example, plain bearings are accommodated. For pivoting the inclination compensating element 5, a pivot drive 7 is accommodated in the interior 20 of the inclination compensating element 5, which is attached on the one hand to the pivot axis 6 and on the other hand to the drive axis 12 arranged below it. The drive axle 12, which is driven via the pivot drive 7, has a toothed pinion 14 at each of its ends, which are driven by the drive axle 12 and each roll on toothed racks 15. The toothed racks 15 have a curved shape which causes the toothed racks to run equidistantly to the pivot axis 6. The toothed racks 15 are formed in alignment opposite one another and facing one another in both retaining arms 22. Facing the outer sides of the holding arms 22, guide grooves 16 are formed adjacent to each rack 15, in each of which a smooth shaft section 17 adjacent to the pinion 12 is guided. The guide grooves 16 are each formed as openings through the retaining arms 22. By driving the drive shaft 12, the angular position of the inclination compensating element 5 relative to the holding frame 4 can be varied, in which the toothed pinion 14 is moved to the left or to the right on the rack 15. This effect allows the device to travel uphill or downhill while keeping the inclination compensation element 5 in a horizontal position. In the illustrated embodiment, the inclination compensating element 5 has a flat surface 27 which is maintained in a horizontal position during normal driving operation. On the upper side 26 of the inclination compensating element 5, projections 28 are formed in the extension of the flat surface 27 at the front and rear in the direction of travel. These serve in particular for mounting connecting elements such as transport devices. The holding frame 4 can be rigidly mounted on a conveyor carriage by means of the four feet 25 shown, so that all angular changes of the traveled path are transmitted one-to-one to the holding frame 4. For detecting the respective change in inclination, the inclination compensation element 5 has an inclination detection unit 21, in particular an inclination sensor 21, which is attached to the inclination compensation element 5 directly below the pivot axis 6. When a change in inclination is detected, the inclination sensor 21 sends corresponding information to a pivot drive control unit 9, which transmits an opposite inclination change command to the electric motor 18, which executes this command by driving the gear 19 and thus the pinion 14 on the rack 15 in such a way that the inclination compensation element 5 is held constantly in a horizontal position. The distance between the pivot axis 6 and the drive axis 12 can be defined as the pivot lever 10, with the pivot drive 7 being fixed between the two axes 6, 12 and in the interior 20 of the inclination compensating element 5, respectively.

The front view of the inclination compensating device 1 shown in FIG. 2 shows in particular the pivot drive 7, which extends between the pivot axis 6 and the drive axis 12. It can be seen that the pivot drive 7 is aligned perpendicular to the drive axis 12. In order to divert the drive force to the gear unit 19, which in this case can be designed in particular as a worm gear, the drive torque is diverted perpendicularly from the drive shaft to the output shaft, in this case the drive axis 12. Furthermore, the worm gear is preferably self-locking, so that a movement of the inclination compensating element 5 about the pivot axis 6 cannot be caused by the weight of the transported material, but only by driving the electric motor 18. It can be seen that the drive axle 12 extends away from both sides of the gear 19 in the direction of both holding arms 22. There, in each case, the drive means 11 formed as toothed pinions 14 engage in the guides 13 formed as toothed racks 15 in the holding arms 22. The smooth shaft sections 17, which are formed integrally with the toothed pinions 14, are each guided towards the outside of the toothed pinions 14 in corresponding guide grooves 16 in order to limit the range of movement of the toothed pinions 14, in particular in the direction of travel and perpendicularly to the direction of travel. It can also be seen that the retaining frame 4 has two lateral retaining arms 22, between which the inclination compensating element 5 is pivotably received, and that the retaining arms 22 are connected to one another, for example welded to one another, via connecting sections 24 in the foot region of the retaining frame 4. The four supporting feet 25 arranged in the corner regions under the holding frame 4 each have at least one recess, by means of which the holding frame can be fixed on a conveyor carriage.

The perspective view of the inclination compensating device 1 in FIG. 3 clearly shows how the inclination compensating mechanism of the device is implemented. In the retaining frame 4, which on the outside has the two retaining arms 22 between which the inclination compensating element 5 is rotatably held and which are connected to one another via opposing connecting sections 24, the inclination compensating element 5 can be pivoted freely so that the inclination compensating element 5 does not collide with the retaining frame 4 even when the entire rack section is traveled. For this purpose, the retaining arms 22 are connected to each other only in a lower region of the retaining frame via the connecting sections 24, so that, as visible in FIG. 3, a distance is kept free between the upper edge of the connecting section 24 and the outer side of the inclination compensating element 5. In addition, the inclination compensating element 5 has a trough-shaped contour, which at the top in the area of the upper side has a wide surface 27 for receiving conveyed material or connecting elements, below which it provides an interior 20 for the pivot drive 7 and tapers towards the bottom, so that even in the case of steep inclines or declines, in which the drive axle 12 or the toothed pinions 14 are in a maximum edge position on the toothed racks 15 as a result of corresponding detection by the inclination detection unit 8 and corresponding actuation by the pivot drive 7, the inclination compensating element 5 does not come into contact with the connection section 24.

FIG. 4 shows a side view of a conveyor device 3, on which conveyor carriages 2 are guided at regular intervals, the conveyor carriages 2 each having an inclination compensation device 1 according to the invention and transport goods being conveyed on some of the carriages shown. The conveyor section 29 thereby passes in the direction of travel 30 from a horizontal section on the left to a section on the right having an incline, wherein it can be seen that the transport devices 31 coupled to the incline compensation elements 5 have a horizontal orientation at each position of the conveyor section 29. Depending on the incline angle α of the conveyor section 29, the incline compensating elements 5 thereby each have an angle corresponding to the incline angle α with respect to the holding frames 4, with which the incline compensating elements 5 are pivoted about the axis of rotation 6 with respect to the holding frame 4. Accordingly, in the case of inclines, the inclination compensating elements 5 incline towards the slope with a corresponding angle by lowering the front side or raising the rear side of the inclination compensating element 5 from their initial position. Correspondingly, on downhill slopes, the inclination compensating elements 5 tilt towards the slope at a corresponding angle by lowering the rear side or raising the front side of the inclination compensating element 5 from their initial position. At the same time, the drive axle 12 moves against the direction of travel 30 when traveling uphill and in the direction of travel 30 when traveling downhill.

The features of the invention disclosed in the foregoing description, in the figures as well as in the claims may be essential for the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An inclination compensating device for a carriage of a conveyor device for horizontal transport of conveyed material, comprising:
   a holding frame and an inclination compensating element held therein via a pivot axis is aligned transversely with respect to the direction of travel,
   a pivot drive for pivoting the inclination compensating element relative to the holding frame about the pivot axis,
   a pivot drive controller receiving inclination change notifications relating to the inclination compensating device, wherein the pivot drive, upon receipt of an inclination change command corresponding to an inclination change notification on the part of the pivot drive controller, is controlled such that the inclination compensating element is continuously held in the horizontal,
   the pivot drive controller being configured for compensating inclination changes that occur when the carriage is driving uphill or downhill; and
   wherein a drive element fastened to an end of a pivot lever extending away from the inclination compensating element opposite the inclination compensating element is driven via the pivot drive, which has a drive axis arranged parallel or perpendicular to the pivot axis, the drive element rolling, in particular in a force-fitting or form-fitting manner, on at least one guide which runs, in particular, equidistantly from the pivot axis and is mounted or formed on the holding frame.

2. The inclination compensating device according to claim 1, wherein the holding frame has two holding arms between which the inclination compensating element is held, wherein the pivot lever is arranged between the holding arms and the guide is mounted or formed on at least one of the holding arms.

3. The inclination compensating device according to claim 2, wherein two drive elements driven by the drive axis are provided, which roll in a force-locking or form-locking manner on two opposite guides, in particular each extending equidistantly to the pivot axis, which are mounted or formed on the two opposite holding arms.

4. The inclination compensating device according to claim 1, wherein the drive element is a toothed pinion mounted on the drive shaft and the guide has a curved toothed rack extending equidistantly from the pivot axis, in which the toothed pinion engages.

5. The inclination compensating device according to claim 4, wherein the guide has a guide groove adjacent to the rack, in which a smooth shaft section adjacent to the teeth of the pinion is guided.

6. The inclination compensating device according to claim 1, wherein the pivot drive is pneumatically operated or comprises a linear drive or a spindle drive.

7. The inclination compensating device according to claim 1, wherein the pivot drive comprises an electric motor and a gear, which are attached to the inclination compensating element and via which the drive axle is driven.

8. The inclination compensating device according to claim 1, wherein the pivot drive is mounted on or in the inclination compensating element.

9. The inclination compensating device according to claim 1, wherein the pivot drive controller receives the inclination change notifications from an inclination change notification unit.

10. The inclination compensating device according to claim 9, wherein the inclination change notification unit is an inclination sensor which is attached to the inclination compensating device or to a conveyor carriage comprising the inclination compensating device.

11. The inclination compensating device according to claim 9, wherein the inclination change notification unit is designed as a light barrier, upon the passage of which an inclination change command is triggered.

12. The inclination compensating device according to claim 1, wherein the inclination change command is obtained by a central control of the conveying device superordinate to the swing drive control.

13. The inclination compensating device according to claim 1, wherein, upon receipt of an inclination change notification by the inclination change notification unit, the pivot drive control outputs a corresponding opposite inclination change command to the pivot drive, by which the at least one drive element is moved on the at least one guide by a distance corresponding to the inclination change notification.

14. The inclination compensating device according to claim 2, wherein the holding arms have two bushings which are aligned with one another and in which the pivot axis arranged on the inclination compensating element is rotatably mounted.

15. The inclination compensating device according to claim 2, wherein the holding arms are coupled to each other via connecting sections such that the inclination compensating element is freely pivotable between the holding arms.

16. The inclination compensating device according to claim 1, wherein the holding frame has a plurality of feet by means of which the inclination compensating device can be fastened on a conveyor carriage.

* * * * *